(12) United States Patent
Feiler et al.

(10) Patent No.: US 6,762,224 B2
(45) Date of Patent: Jul. 13, 2004

(54) COMPOUNDS FOR MASS COLOURATION OF HIGH TEMPERATURE POLYMERS

(75) Inventors: Leonhard Feiler, Neuenburg (DE); Zhimin Hao, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 113 days.

(21) Appl. No.: 09/996,434

(22) Filed: Nov. 20, 2001

(65) Prior Publication Data

US 2002/0065401 A1 May 30, 2002

Related U.S. Application Data

(62) Division of application No. 09/735,081, filed on Sep. 7, 2000, now Pat. No. 6,355,783.

(30) Foreign Application Priority Data

Sep. 24, 1999 (CH) .............................................. 1755/99

(51) Int. Cl.[7] .................................. C08K 5/34
(52) U.S. Cl. ................... 524/87; 524/88; 524/89; 524/90; 524/92; 524/93; 524/94; 524/190; 524/242; 106/286.1; 106/286.5; 106/287.25; 252/8.8; 252/183.13
(58) Field of Search ............................. 524/87, 88, 89, 524/90, 92, 93, 94, 190, 242; 106/286.1, 286.5, 287.25; 252/8.8, 183.13

(56) References Cited

U.S. PATENT DOCUMENTS

| | | | |
|---|---|---|---|
| 4,408,840 A | 10/1983 | Imazeki et al. | 350/349 |
| 4,923,974 A | 5/1990 | Ueda et al. | 534/799 |
| 5,476,886 A | * 12/1995 | Wallquist et al. | 524/92 |
| 5,484,943 A | * 1/1996 | Zambounis et al. | 548/453 |
| 5,518,539 A | 5/1996 | Hao et al. | 106/495 |
| 5,561,232 A | 10/1996 | Hao et al. | 546/14 |
| 5,738,719 A | 4/1998 | Wallquist et al. | 106/498 |
| 5,750,758 A | 5/1998 | Zambounis et al. | 558/276 |
| 6,063,924 A | 5/2000 | Hall-Goulle | 546/49 |

FOREIGN PATENT DOCUMENTS

| | | |
|---|---|---|
| EP | 0 892 018 | 1/1999 |
| JP | 59012970 | 1/1984 |
| JP | 63130670 | 6/1988 |
| JP | 63161058 | 7/1988 |
| WO | 98/32802 | 7/1998 |
| WO | 98/58027 | 12/1998 |

OTHER PUBLICATIONS

Chemical Abstract No. 1993:580828 of JP 05105683 (1993).
Chemical Abstract No. 1994:8614 of WO 9309664 (1994).
Becker et al., Chemical Abstracts 134:87581 (2000).
Chemical Abstract No. 1995:523970 of JP 07025169 (1995).
Chemical Abstract No. 1989:203059 of JP 64003176 (1989).

* cited by examiner

Primary Examiner—Kriellion A. Sanders
(74) Attorney, Agent, or Firm—Kevin T. Mansfield

(57) ABSTRACT

The invention relates to novel soluble pigment precursors possessing not only higher thermal stability but also improved solubility characteristics and to a process for mass colouration of high temperature polymers that utilizes these novel soluble pigment precursors.

The pigment precursors of the invention are essentially of the formula $$A(B)_x \qquad (I)$$

where x is an integer from 1 to 8,
A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and
B is hydrogen or a group of the formula

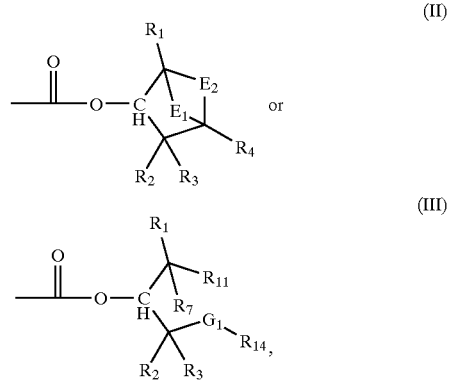

although at least one B group is not hydrogen and when x is from 2 to 8 the B groups may be identical or different, $E_1$, $E_2$, $R_1$, $R_2$, $R_3$, $R_4$, $R_7$, $R_{11}$, $R_{14}$, and $G_1$ are as defined in the specification.

12 Claims, No Drawings

COMPOUNDS FOR MASS COLOURATION OF HIGH TEMPERATURE POLYMERS

This is a divisional of application Ser. No. 09/735,081, filed on Sep. 7, 2000, now U.S. Pat. No. 6,355,783.

The invention relates to novel soluble pigment precursors possessing not only higher thermal stability but also improved solubility characteristics and to a process for mass coloration of high temperature polymers that utilizes these novel soluble pigment precursors.

Soluble pigment precursors and their thermal decomposition in situ, for example in a photosensitive composition, a polymer, an aqueous dispersion, a porous material or a surface, to form pigments having superior properties are known from EP-A-0 648 770, EP-A-0 648 817, EP-A-0 654 506, EP-A-0 654 711, EP-A-0 742 255, EP-A-742 556, EP-A-0 761 772, EP-A-0 764 628, EP-A-0 892 018, EP-A-0 718 697, WO-98/32802, WO-98/45756, WO-98/45757, WO-98/58027, WO-99/01511 and WO-99/01512.

However, it has been determined that these soluble pigment precursors do not adequately meet the highest requirements. For instance, many pigment precursors, some of them readily soluble, are thermally impossible to convert selectively and quantitatively into the desired pigments. Other pigment precursors conversely combine excellent thermal convertibility with undesirably low solubility.

It has been found that, surprisingly, there is a previously unrecognized possibility of combining good solubility and superior thermal properties of pigment precursors by using novel substitution pattern. The novel compounds are highly mobile below their starting decomposition temperature and provide technically significant, in certain cases even unique application advantages as detailed hereinbelow.

The invention accordingly provides a compound of the formula

where x is an integer from 1 to 8,
A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and
B is hydrogen or a group of the formula

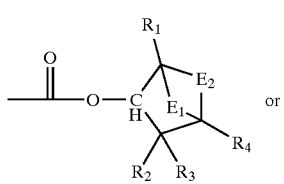

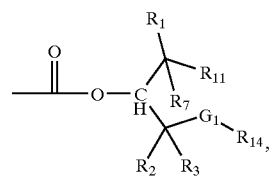

although at least one B group is not hydrogen and when x is from 2 to 8 the B groups may be identical or different,
$E_1$ is oxygen or is selected from the group consisting of methylene, methyleneoxy and ethylene, each member of the group being unsubstituted or substituted by one $R_5$ or by 2 radicals, $R_5$ and $R_6$, or is two separate radicals, $R_7$ and $R_8$, $R_7$ being attached to the same atom as $R_1$ and $R_8$ to the same atom as $R_4$,
$E_2$ is selected from the group consisting of methylene, ethylene, propylene and butylene, each member of the group being unsubstituted or substituted by one $R_9$ or by 2 radicals, $R_9$ and $R_{10}$, or is two separate radicals, $R_{11}$ and $R_{12}$, $R_{11}$ being attached to the same atom as $R_1$ and $R_{12}$ to the same atom as $R_4$,
$G_1$ is O or $N(R_{13})$,
$R_1$ is hydrogen, methyl, ethyl, methoxy or ethoxy,
$R_2$ and $R_3$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy,
$R_4$ is hydrogen, $C_1$–$C_8$alkyl, $C_1$–$C_8$alkoxy, $C_1$–$C_8$alkoxy-$C_2$–$C_8$alkylene, $C_1$–$C_8$alkoxy-$C_2$–$C_8$alkyleneoxy, $C_5$–$C_6$cycloalkyl, $C_5$–$C_6$cycloalkoxy, phenyl, phenoxy or a 5- or 6-membered, saturated or singly to triply unsaturated heterocyclic radical,
$R_5$, $R_6$, $R_9$, $R_{10}$ and $R_{12}$ are independently $C_1$–$C_8$alkyl or $C_1$–$C_8$alkoxy, or $R_6$ and $R_9$ together are a direct bond,
$R_7$ and $R_8$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy,
$R_{11}$ is hydrogen, $C_1$–$C_8$alkyl or $C_1$–$C_8$alkoxy,
$R_{13}$ is methyl or ethyl, and
$R_{14}$ is $C_1$–$C_8$alkyl, $C_5$–$C_6$cycloalkyl, phenyl or a 5- or 6-membered, saturated or singly to triply unsaturated heterocyclic radical,
it being possible for two methoxies attached to the same carbon atom to combine and form 1,2-ethylenedioxy, or for methoxy to combine with ethoxy attached to the same carbon atom to form 1,2- or 1,3-propylenedioxy, or for methoxy or ethoxy to combine with ethoxy attached to α- or β-enchained carbon to form dimethylmethylene,
and where additionally
a) $R_1$, $R_2$, $R_3$, $R_7$ or $R_{11}$ is hydrogen, and
b) when $E_1$ is two separate radicals $R_7$ and $R_8$ and $E_2$ is methylene or ethylene at least one of the following further conditions applies:
$R_1$, $R_2$, $R_3$, $R_4$, $R_7$, $R_8$, $R_9$ or $R_{10}$ is methoxy or ethoxy;
$R_2$, $R_3$, $R_4$, $R_7$, $R_8$, $R_9$ or $R_{10}$ is secondary $C_3$–$C_8$alkyl or tertiary $C_4$–$C_8$alkyl or $C_3$–$C_8$alkoxy;
$R_2$, $R_3$, $R_7$ or $R_8$ is $C_1$–$C_8$alkoxy-$C_2$–$C_8$alkylene or $C_1$–$C_8$alkoxy-$C_2$–$C_8$alkyleneoxy; or
$R_4$ is $C_5$–$C_6$cycloalkyl, $C_5$–$C_6$cycloalkoxy, phenyl, phenoxy or a 5- or 6-membered heterocyclic radical.

As is evident from this definition, substitution is of major significance for cyclic compounds.

$C_1$–$C_8$Alkyl, including in $C_1$–$C_8$alkoxy, is for example methyl, ethyl, n-propyl, isopropyl, n-butyl, 2-butyl, isobutyl, tert-butyl or any isomer of pentyl, hexyl, heptyl or octyl, such as tert-amyl or tert-octyl. $C_1$–$C_8$Alkyl is preferably secondary $C_3$–$C_8$alkyl or tertiary $C_4$–$C_8$alkyl. $C_5$–$C_6$Cycloalkyl, including in $C_5$–$C_6$cycloalkoxy, is cyclopentyl or cyclohexyl.

$C_2$–$C_8$Alkylene, including in $C_1$–$C_8$alkoxy, may be straight-chain, branched or cyclic. Examples are 1,2-ethylene, 1,2-propylene, 1,3-propylene, an isomer of butylene, pentylene, hexylene, heptylene, octylene or cyclopentylene, cyclohexylene or cyclooctylene.

5- or 6-membered, saturated or singly to triply unsaturated heterocyclic radicals are for example 2- or 3-furyl, 2- or 3-thienyl, 1-pyrryl, 2H-2-pyrryl, 2H-2-pyranyl, 4H4- pyranyl, 2- or 4-pyridyl, 1-, 2-, 3- or 4-piperidyl, 1-, 2- or 3-pyrrolidinyl, or any isomer of imidazolidinyl, imidazolinyl, pyrazolidinyl, pyrazolinyl, pyrazolyl, quinuclidinyl, pyrazinyl, pyrimidinyl, pyridazinyl, morpholinyl, furyl, dihydrofuryl, tetrahydrofuryl, dihydropyranyl or tetrahydropyranyl.

Examples of bicyclic groups on the carboxyl group in the formula (II) are cyclic terpene radicals, such as thujyl, caryl, pinyl, bornyl, norcaryl, norpinyl or norbornyl.

$E_1$ is preferably oxygen, methylene or two separate radicals $R_7$ and $R_8$, especially methylene or two separate radicals $R_7$ and $R_8$.

$E_2$ is preferably ethylene or two separate radicals $R_{11}$ and $R_{12}$.

$G_1$ is preferably O.

$R_1$ is preferably hydrogen, methyl, ethyl, methoxy or ethoxy.

$R_2$, $R_3$ and $R_4$ are preferably hydrogen or $C_1$–$C_8$alkyl.

$R_5$, $R_6$, $R_9$, $R_{10}$ and $R_{12}$ are preferably methyl, secondary $C_3$–$C_8$alkyl or tertiary $C_4$–$C_8$alkyl.

$R_7$, $R_8$ and $R_{11}$ are preferably hydrogen or methyl, especially hydrogen.

$R_{14}$ is preferably $C_1$–$C_8$alkyl.

Preference is given to B groups which exclusively of the carboxyl group contain at most 3 further oxygen atoms, especially no or 1 to 2 further oxygen atoms, particularly preferably no or 1 further oxygen atom. When a B group exclusively of the carboxyl group contains 2 or 3 further oxygen atoms, it is preferable for no carbon atom in this B group other than in the carboxyl group to be bonded to more than one oxygen atom.

Preference is given to groups of the formulae (II) or (III) which are asymmetrical. Particular preference is given to groups of the formulae

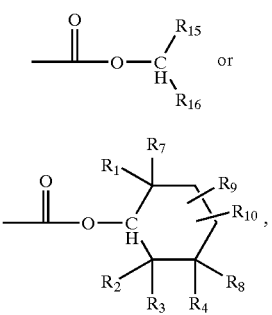

where $R_{15}$ is —$CR_1R_7R_{11}$ and $R_{16}$ is —$CR_2R_3$—$CR_4R_8R_{12}$ or —$CR_2R_3$—$G_1R_{14}$, and $R_2$, $R_3$, $R_4$, $R_7$, $R_8$, $R_9$ or $R_{10}$ is secondary $C_3$–$C_8$alkyl or tertiary $C_4$–$C_8$alkyl, especially tert-butyl, tert-amyl or 2,4-dimethyl-2-pentyl.

Very particular preference is given to groups of the formulae (II) and especially (IV).

The compounds of the invention are notable for improved thermal characteristics. At temperatures of about 140° C. to about 220° C., customary during incorporation into many polymers, they will disperse therein very homogeneously, usually with complete dissolution, without decomposing into the pigment. On cooling they crystallize back out within the polymer. This provides, for example with the diketopyrrolopyrroles, excellent, particularly homogeneous colour and/or fluorescent pigmentations.

On the other hand, the compounds of the invention decompose very smoothly at temperatures of about 220 to 300° C. As a result, prolonged heating, which may harm polymers, can be substantially or completely avoided. In addition, finer, even more transparent, isometric and less dichroic pigment particles are obtained than with prior art pigment precursors, which is of particular advantage in fibres and in injection moulding processes in particular.

The invention accordingly further provides a process for mass coloration of a polymer, which comprises adding at least one compound of the formula (I) to the polymer before or during processing, the processing taking the form of extrusion, injection moulding or fibre spinning at 220 to 330° C., preferably at 250 to 320° C., especially 280 to 300° C.

As mentioned above, the compounds of the invention form pigments very rapidly at high temperatures. However, it has highly surprisingly been discovered that their colour already starts to change at much lower temperatures. Depending on the temperature, it is possible to get different colours as illustrated by some of the examples which follow. The intermediate colours are likely due to partially decomposed compounds of the formula (I); it could be due either to the simultaneous presence of compounds of the formula (I) and pigments of the formula $A(H)_x$ (VI) or to the presence of some intermediates. Preferred chromophores for intermediate colours are quinacridones, perylenes, indigos, azos and phthalocyanines, most preferred the quinacridone and indigo chromophores.

The intermediate colours are attractive and can be used purely for decorative purposes. By heating to higher temperatures, they can be further transformed into the pigmentary colour, thus enabling them to be used in thermochromic media, in particular in security items. A preferred use is the selective coloration in the mass of one or more polymeric parts of a composite item, for example to a transparent film, tape or patch of arbitrary shape laminated between the support and the transparent cover of a security item such as but not restricted to identity, bank, credit or company cards, checks, banknotes, driving licenses or any other badges, pass or permits. Counterfeiting security items comprising the instant intermediate, thermochromic colours becomes much more difficult for reasons evident to a person skilled in the art but which should of course not be disclosed to potential counterfeiters.

The invention accordingly also provides a thermochromic material comprising a polymer coloured in the mass by a product obtainable by partial thermal decomposition of a compound of the formula (I) or by two compounds, selected from the group consisting of compounds of the formula (I) and pigments of the formula $A(H)_x$ (VI). In a preferred embodiment, said material is comprised within a composite, especially a security item.

The polymer is preferably a polyolefin, polyester or polyamide, especially polypropylene, or some other engineering plastic, for example a polyimide, polysulfone, polyether sulfone, polyphenylene oxide, polyarylene, polyarylene sulfide, polyepoxide, polyphenylene oxide or ABS.

In addition, many compounds of the formula (I) have a melting point which is lower than the decomposition point, although the latter is none the less still located in a useful range below the onset of decomposition of the material to be pigmented. This allows pigmentation of all sorts of materials, for example porous metal oxide layers or sintered materials as described in WO-00/27930 or EP-00810309.5, in significantly higher colour strength. Pigment coatings, as disclosed in EP-A-0 742 556, can also be produced on a smooth surface, in which case the improved thermal properties of the compounds of the formula (I) ensure that astonishingly good results are obtained.

The invention accordingly also provides a process for pigmenting a porous material, which comprises at least one compound of the formula (I), in liquid form or dissolved in an inert liquid in a weight concentration of at least 25%, penetrating into the pores of the porous material and thereafter being thermally converted into a pigment of the formula $A(H)_x$ (VI).

Useful solvents include for example hydrocarbons, alcohols, amides, nitriles, nitro compounds, N-heterocycles, ethers, ketones and esters and may be singly or multiply unsaturated or halogenated. Examples are methanol, ethanol, isopropanol, diethyl ether, acetone, methyl ethyl ketone, 1,2-dimethoxyethane, 1,2-diethoxyethane, 2-methoxyethanol, ethyl acetate, tetrahydrofuran, dioxanes, acetonitrile, benzonitrile, nitrobenzene, N,N-dimethylformamide, N,N-dimethylacetamide, dimethyl sulfoxide, N-methylpyrrolidone, pyridine, picoline, quinoline, trichloroethane, benzene, toluene, xylene, anisole and chlorobenzene. Further examples may be taken from standard works. The solvent may also be a mixture of 2 or more, for example 3 to 5, liquids. Further details may be taken from WO-98/58027 or WO-00/36210.

The compounds of the formula (I) may also be employed with significant practical benefits, readily apparent to those skilled in the art from the improved thermal characteristics, in reactive extrusion, colour filters, thermodiffusion media, ink-jet printing dispersions, electrophotographic photoreceptors or for colouring wood, these processes being known per se for example from EP-A-0 654 711, EP-A-0 718 697, EP-A-0 892 018, WO-98/45756, WO-98/58027, WO-99/01511 or WO-00/36210, although the imperfect combination of the physical properties (especially solubility ↔decomposition point) of previously known compounds did not lead to fully satisfactory results.

The compounds of the formula (I) may be used individually or else in the form of mixtures with other compounds of the formula (I) or with other pigment precursors, for example those disclosed in EP-A-0 648 770, EP-A-0 648 817, EP-A-0 654 506, EP-A-0 742 255, EP-A-0 761 772, WO-98/32802, WO-98/45757, WO-99/01512, WO00/17275 or PCT/EP-00/03085.

This can be used to produce, for example, solid solutions or mixed crystals, in which case host and guest components having identical or else different decomposition points can be used, depending on the desired objective. When host and guest components having different decomposition points are used, the decomposition point of the host component may be lower or higher than those of the guest components.

A preferred embodiment is the use of binary or ternary mixtures including 60 to 99.9% by weight of a compound of the formula (I) and 0.1 to 40% by weight of one or two thermally more labile compounds of the same chromophore class with an A' that differs from A, preferably a binary mixture of 99.5 to 95% by weight of a compound of the formula (I) and 0.5 to 5% by weight of a thermally more labile compound of the same chromophore class with an A' that differs from A.

The thermally more labile compound of the same chromophore class with an A' that differs from A is particularly preferably a compound of the formula

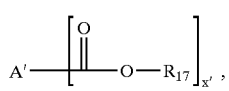

(VII)

where x' is an integer from 1 to 8 and A' is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x' —$COOR_{17}$ groups via one or more heteroatoms, these heteroatoms being selected from the group consisting of N, O and S and forming part of the radical A' and $R_{17}$ being any desired tertiary group. As particularly customary $R_{17}$ radicals there may be mentioned by way of example tert-butyl, tert-amyl, 2-methyl-3-buten-2-yl, 2-methyl-3-butyn-2-yl, 4-oxa-2-pentyl or 4,7-dioxa-1-methyl-2-octyl, this being just a small selection of known radicals which are cited in the above-cited publications, which are hereby expressly incorporated herein for further examples.

Very particular preference is given to compounds of the formula (VII), whose basic structure $A'(H)_{x'}$(VIII) is known to lead to synergistic effects with the basic structure $A(H)_x$ (VI) of the compound of the formula (I), the known effect being much intensified when the compounds of the formula (I) have higher decomposition temperatures than the compounds of the formula (VII). This is very surprising because one would expect on the contrary that the effect would be at its most intense when the compounds of the formula (I) and (VII) thermally decompose to the pigment at one and the same time (see JP-A-11/305032).

An example of this is the use of mixtures of two 1,4-diketo-3,6-diarylpyrrolo[3,4-c]pyrroles of the formulae (I) and (VII) where aryl is phenyl, chlorophenyl, dichlorophenyl, tolyl, p-cyanophenyl, tert-butylphenyl or biphenyl in the formula (I) and m-cyanophenyl in the formula (VII). Corresponding compositions comprising $A(H)_x$ (VI) and $A'(H)_{x'}$ (VIII) are known from EP-A-0 748 851.

It is particularly in polymers that are processed at a temperature of at least 220° C., for example polypropylene at 240 to about 330° C., that these mixtures provide very surprising advantages in transparency and colour properties, specifically colour strength and saturation, especially and particularly by comparison with the corresponding known compositions.

The compounds of the formulae (I) may be prepared in a conventional manner from known pigments and chloroformic esters or pyrocarbonates obtainable analogously to known processes. Known processes for preparing pyrocarbonates useful as starting materials for pigment precursors are disclosed for example in EP-A-0 764 628 or CH-2585/98.

A is the radical of known chromophores having the basic structure $A(H)_x$ (VI), although on every heteroatom linked to x B groups A preferably has at least one immediately adjacent or conjugated carbonyl group, for example

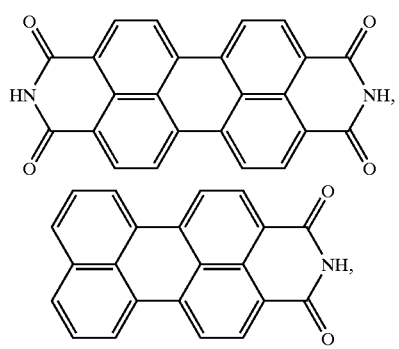

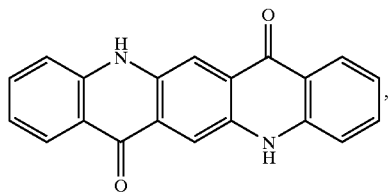,
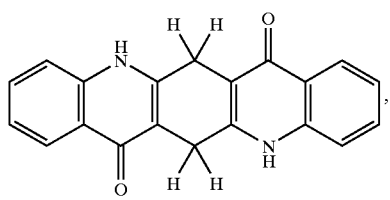,
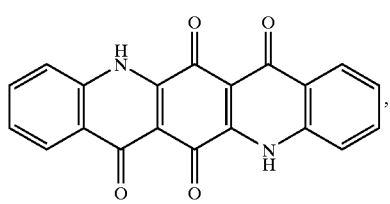,
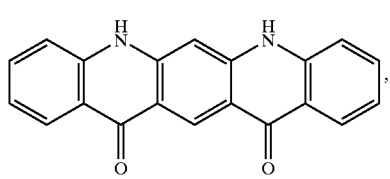,
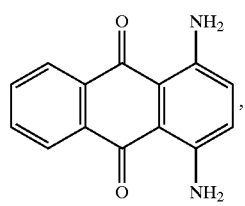,
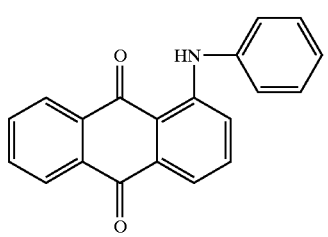,
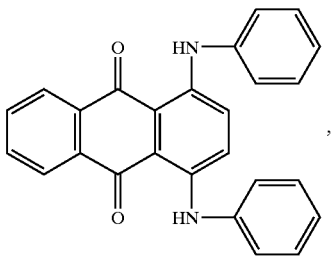,
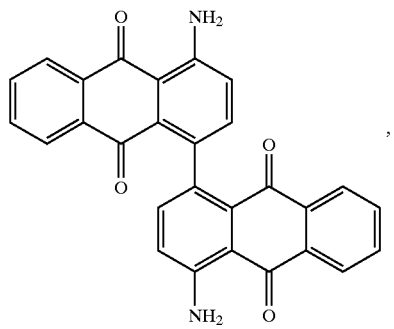,
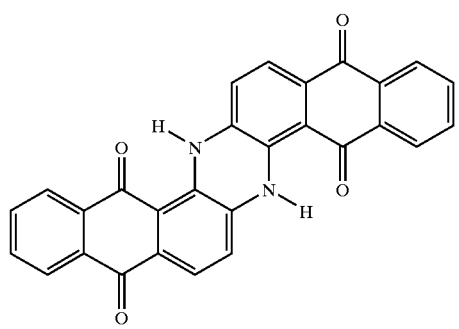,
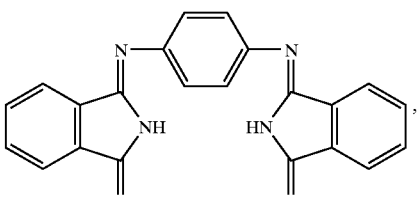,
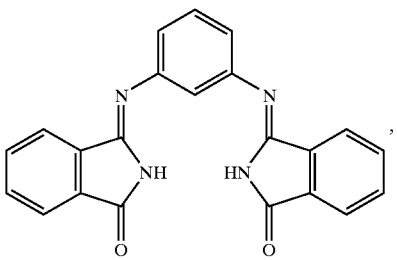,
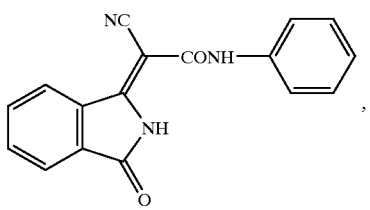,
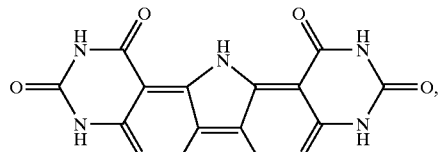,
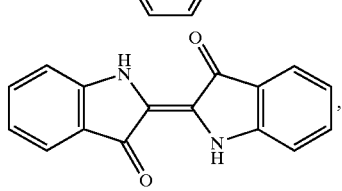, -continued
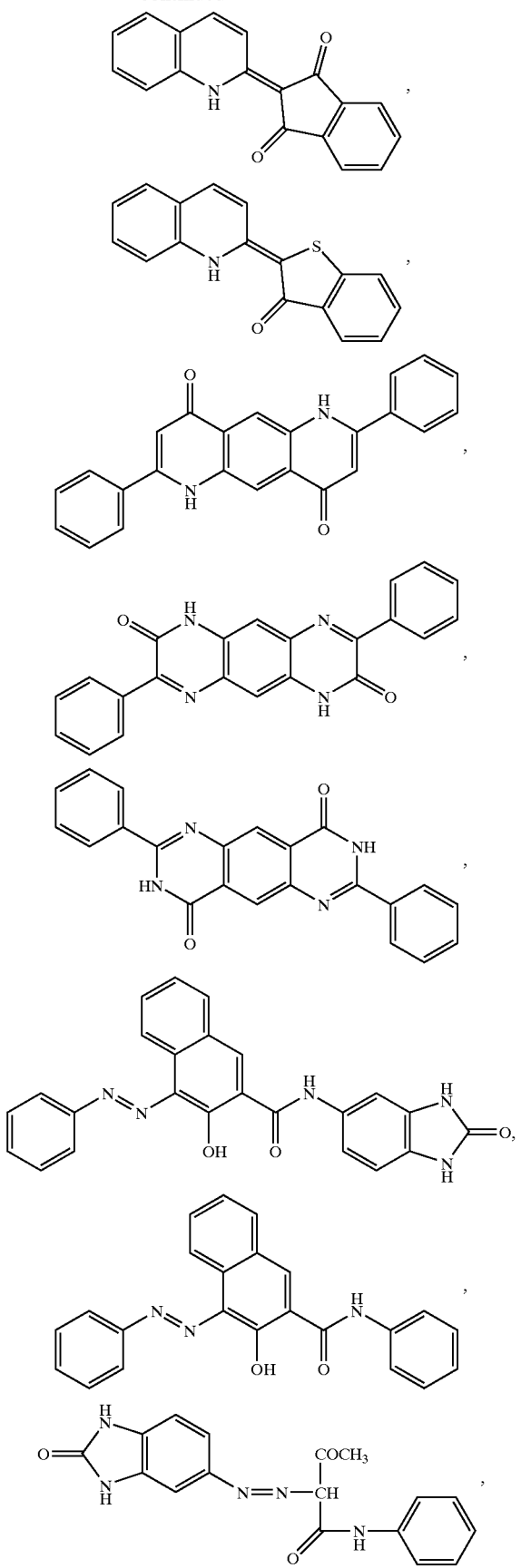
-continued
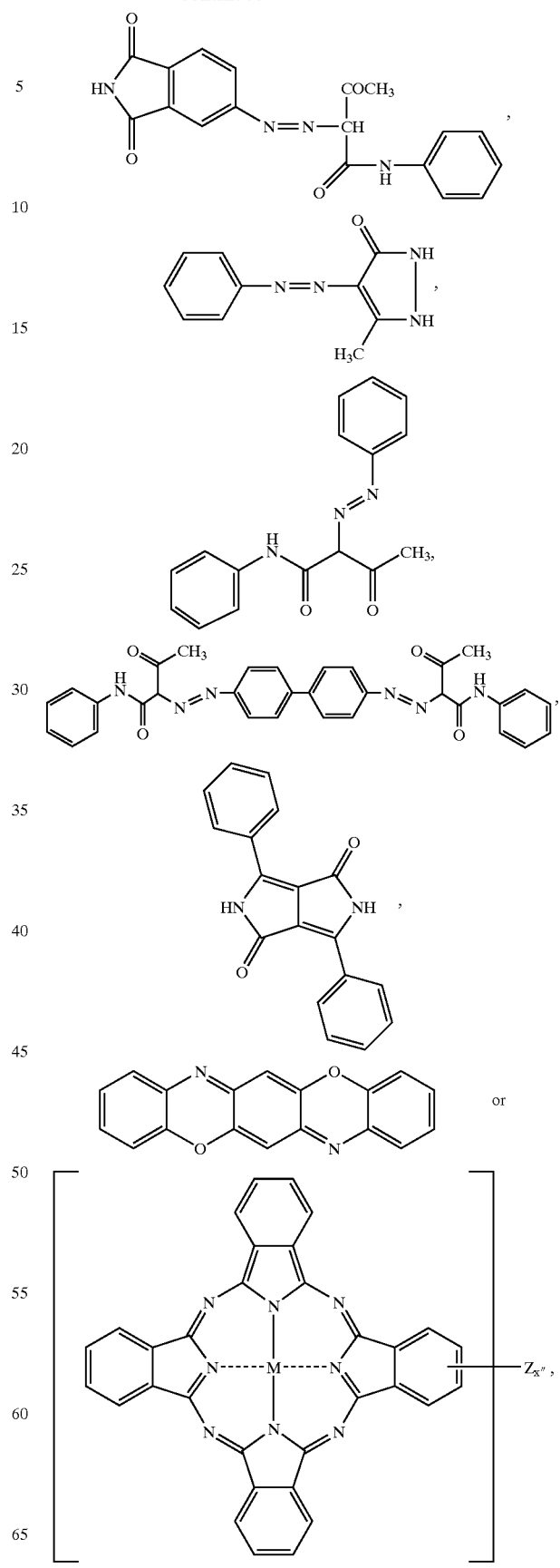

-continued

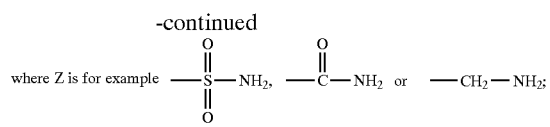

and also in each case all known derivatives thereof, as for example disclosed in the abovementioned patent applications or described by Willy Herbst and Klaus Hunger in "Industrial Organic Pigments" (ISBN 3-527-281614, VCH/Weinheim 1993).

Particular utility is possessed by those soluble chromophores wherein the basic structure $A(H)_x$ (VI) is Colour Index Pigment Yellow 13, Pigment Yellow 73, Pigment Yellow 74, Pigment Yellow 83, Pigment Yellow 93, Pigment Yellow 94, Pigment Yellow 95, Pigment Yellow 109, Pigment Yellow 110, Pigment Yellow 120, Pigment Yellow 128, Pigment Yellow 139, Pigment Yellow 151, Pigment Yellow 154, Pigment Yellow 175, Pigment Yellow 180, Pigment Yellow 181, Pigment Yellow 185, Pigment Yellow 194, Pigment Orange 31, Pigment Orange 71, Pigment Orange 73, Pigment Red 122, Pigment Red 144, Pigment Red 166, Pigment Red 184, Pigment Red 185, Pigment Red 202, Pigment Red 214, Pigment Red 220, Pigment Red 221, Pigment Red 222, Pigment Red 242, Pigment Red 248, Pigment Red 254, Pigment Red 255, Pigment Red 262, Pigment Red 264, Pigment Brown 23, Pigment Brown 41, Pigment Brown 42, Pigment Blue 25, Pigment Blue 26, Pigment Blue 60, Pigment Blue 64, Pigment Violet 19, Pigment Violet 29, Pigment Violet 32, Pigment Violet 37, 3,6-di(4'-cyano-phenyl)-2,5-dihydro-pyrrolo[3,4-c]pyrrole-1,4-dione, 3,6-di(3,4-dichloro-phenyl)-2,5-dihydro-pyrrolo[3,4-c]pyrrole-1,4-dione or 3-phenyl-6-(4'-tert-butyl-phenyl)-2,5-dihydro-pyrrolo[3,4-c]pyrrole-1,4-dione.

Mention may be made in particular of 3,6-diaryl-pyrrolo[3,4-c]pyrrole-1,4-diones of the formula (I) that contain 2 groups of the formula (II).

The compounds of the formula (I) according to the invention are also very useful fluorescent dyes for mass coloration of high molecular weight organic material which are processed at a temperature of about 140° C. to 220° C.

Examples of useful high molecular weight organic materials that can be fluorescent-coloured with the compounds of the formula I according to the invention are vinyl polymers, such as polystyrenes, polyacrylates, poly(vinyl chloride), poly(vinyl fluoride), poly(vinyl acetate), poly(alkyl vinyl ether)s, polyurethanes, polyolefins, polyalkadienes and polycarbonates. High molecular weight organic materials can be of natural or artificial origin and customarily have a molecular weight in the range from $10^3$ to $10^8$ g/mol.

Based on the high molecular weight organic material to be coloured, the compounds of the formula (I) according to the invention can be used in an amount of 0.01 to 30% by weight, preferably 0.1 to 10% by weight.

If appropriate, customary additives, such as stabilizers, plasticizers, fillers or other colour-conferring ingredients, such as white, colour or black pigments, may also be added in any desired customary amounts. The coloured material is then brought to the desired final form in a conventional manner, such as calendering, pressing, extruding, coating, casting, injection moulding or powder coating.

The fluorescent colourations obtainable thereby are notable for particularly high quantum yield and homogeneity.

The invention accordingly further provides high molecular weight organic material having a glass transition point $(T_g)$ of 140° C. to 220° C. and containing in its bulk 0.1 to 10% by weight of a compound of the formula (I), based on the total weight.

The examples which follow illustrate the invention. %ages are by weight, unless otherwise stated.

EXAMPLE A1

410.0 g of 2,4-di-tert-butylphenol are hydrogenated in 820 ml of ethanol under 40 bar at 60° C. using 20 g of rhodium on carbon (5%) for 21 hours. To complete the reaction, the pressure is raised to 120 bar, a further 10 g of rhodium on carbon (5%) are added, and the hydrogenation is continued at 100° C. for 17 hours. The catalyst is filtered off, the solvent is distilled off under reduced pressure, and the residue is distilled off under high vacuum to leave 380.43 g (91% of theory) of 2,4-di-tert-butylcyclohexanone (mixed isomers) as a colourless liquid. Boiling point: 79–86° C./0.22 mbar.

380 g of 2,4-di-tert-butylcyclohexanone (mixed isomers) in 200 ml of ether are added dropwise with vigorous stirring to a suspension of 34.3 g (903 mmol) of lithium aluminium hydride in 1800 ml of ether over 4 hours, and the batch is subsequently stirred at 23° C. for 1 hour and admixed with 500 ml of 5% hydrochloric acid by vigorous stirring. The organic phase is separated off and washed twice with 250 ml of water each time. The organic phase is dried over $MgSO_4$, evaporated and dried under reduced pressure to leave 337.80 g (88% of theory) of 2,4-di-tert-butylcyclohexanol (mixed isomers) as colourless wax.

EXAMPLE A2

500.0 g of 2,6-di-tert-butyl-phenol are hydrogenated in 1200 ml of methanol under 100 bar at 60° C. using 50 g of rhodium on carbon (5%) for 12 hours. The catalyst is filtered off and washed with ethanol. The solvent is distilled off under reduced pressure and the residue is distilled under high vacuum to leave 494.3 g (97% of theory) of 2,6-di-tert-butyl-cyclohexanone as a mixture of colourless crystals with a colourless liquid. Boiling point of the isomers: 63° C. (0.1 mbar) and 67° C. (0.08 mbar). These products are converted into 2,6-di-tert-butyl-cyclohexanol as in Example A1.

EXAMPLE A3

1-(2-Furyl)-2-propanol is prepared as described in Chem. Ber. 109, 2628 (1976). NMR ($CDCl_3$) [ppm]: δ=7.32 (d, 1H), 6.30 (t, 1H), 6.09 (d, 1H), 4.06 (m, 1H), 2.76 (m, 2H), 2.24 (s, 1H), 1.22 (d, 3H).

EXAMPLES B1–B17

General Prescription 11.14 g of sodium hydride are washed with 100 ml of toluene and heated to 90° C. together with 400 ml of toluene. To this suspension is added dropwise with vigorous stirring a mixture of 278.4 mmol of the below-specified alcohols in 30 ml of toluene and the mixture is then maintained at 90–110° C. for 1 hour. The suspension is cooled down to 5° C. and then carbon dioxide is introduced in such a way with vigorous stirring that the temperature does not exceed 10° C. The introduction of carbon dioxide is ended after 1½ hours, when 1.06 g of benzyltriethylammonium chloride, 0.72 ml of pyridine and 22.12 g of toluenesulphonyl chloride are added, and the batch is stirred at 20–25° C. for 15–20 hours. The typically yellowish to reddish suspension has gradually added to it dropwise with vigorous stirring 100 ml of 10% sulphuric acid and the mixture is stirred at 23° C. for ½ an hour. The aqueous phase is separated off, the organic phase is extracted 3 times with water, dried over MgSO$_4$, and the solvent is evaporated off under reduced pressure. The residue is subjected to a high vacuum distillation, the dicarbonate being fractionally distilled according to its boiling point or only the impurities being removed by distillation.

| Ex. | Alcohol | Pyrocarbonate | Yield | NMR | Analysis |
|---|---|---|---|---|---|
| B1 | 4-Heptanol | 41° C./2 × 10$^{-3}$ mbar | 60% of th. | ✓ | ✓ |
| B2 | 2-Pentanol | 73–74° C./2 × 10$^{-3}$ mbar | 58% of th. | ✓ | ✓ |
| B3 | 2-Hexanol | orange oil | 67% of th. | ✓ | ✓ |
| B4 | 2-Heptanol | 27–30° C./6 × 10$^{-3}$ mbar | 76% of th. | ✓ | ✓ |
| B5 | 2-Octanol | yellow, turbid oil | 61% of th. | ✓ | ✓ |
| B6 | 2-Nonyl alcohol | brownish oil | 52% of th. | ✓ | ✓ |
| B7 | (−)-Bornyl alcohol | yellowish solid | 76% of th. | ✓ | ✓ |
| B8 | 2-Ethoxy-cyclohexanol | yellowish oil | 73% of th. | ✓ | ✓ |
| B9 | (−)-2-Isopropyl-5-methyl-cyclohexanol | lightly brownish oil | 93% of th. | ✓ | ✓ |
| B10 | 1-Methoxy-2-propanol | 98° C./1 × 10$^{-3}$ mbar | 61% of th. | ✓ | ✓ |
| B11 | 1-Phenyl-hydroxyethanol | brownish oil | 75% of th. | ✓ | ✓ |
| B12 | Phenyl-2-propanol | yellowish liquid | 95% of th. | ✓ | ✓ |
| B13 | 1-(2'-Furyl)-2-propanol | brownish oil | 59% of th. | ✓ | ✓ |
| B14 | 2-tert-Butyl-cyclohexanol | dark brown oil | 78% of th. | ✓ | ✓ |
| B15 | 4-tert-Butylcyclohexanol | dark brown oil | 62% of th. | ✓ | ✓ |
| B16 | 2,4-Di-tert-butylcyclohexanol | dark liquid | 63% of th. | ✓ | ✓ |
| B17 | 2,6-Di-tert-butyl-cyclohexanol | 100° C./8 × 10$^{-3}$ mbar | 58% of th. | ✓ | ✓ |

EXAMPLES C1–C14

General Prescription

A pigment is mixed with dicarbonate, tetrahydrofuran and 4-dimethylaminopyridine and the mixture is stirred. After the reaction has ended, the mixture is filtered through a glass microfilter supporting a cotton filter, the solvent is evaporated off under reduced pressure, and the desired product is precipitated with an alcohol and recrystallized. The precipitate is filtered off with suction and dried under reduced pressure.

EXAMPLE C1

2.14g of 3,6-di-(4'-chlorophenyl)-pyrrolo[3,4,c]pyrrole-1,4-dione (Pigment Red 254), 7.26 g of 4-heptyl pyrocarbonate from Example B1, 0.30 g of 4-dimethylaminopyridine and 150 ml of dry tetrahydrofuran are mixed and the mixture is stirred at room temperature for 165 minutes. The suspension is filtered through a glass microfilter supporting a cotton filter, the solvent is evaporated off under reduced pressure and the residue is admixed with 50 ml of isopropanol. After 16 hours the precipitate is filtered off with suction and dried under reduced pressure to leave 1.90 g (49% of theory) of 2,5-di4-heptyloxycarbonyl-3,6-di-(4'-chlorophenyl)-pyrrole-[3,4,c]pyrrole-1,4-dione as orange crystals. NMR (CDCl$_3$) [ppm]: δ=7.67 (d, 4H), 7.46 (d, 4H), 4.98 (m, 2H), 1.55 (m, 8H), 1.30 (m, 8H), 0.90 (t, 6H).

| Elemental analysis [%]: | theor.: C 63.65 | H 5.97 | N 4.37 | Cl 11.05; |
|---|---|---|---|---|
| C$_{34}$H$_{38}$N$_2$O$_6$Cl$_2$ | found: C 63.45 | H 5.60 | N 4.35 | Cl 11.06. |

Melting and decomposition points are reported in the table which follows.

EXAMPLE C2

4.28 g of 3,6-di-(4'-chlorophenyl)-pyrrolo[3,4,c]pyrrole-1,4-dione, 5.91 g 2-pentyl dicarbonate from Example B2, 0.40 g of 4-dimethylaminopyridine and 500 ml of dry tetrahydrofuran are mixed and the mixture is stirred at 55° C. for 4 hours. The suspension is filtered off with suction on a glass microfilter supporting a cotton filter, the solvent is evaporated off under reduced pressure, and the residue is admixed with 50 ml of isopropanol. After 30 minutes the precipitate is filtered off with suction and washed with 15 ml of isopropanol, and the yellow product is dried under reduced pressure to leave 2.86 g (41% of theory) of 2,5-di-2-pentyloxycarbonyl-3,6-di-(4'-chlorophenyl)-pyrrolo[3,4,c]pyrrole-1,4-dione as yellow powder. NMR (CDCl$_3$) [ppm]: δ=7.65 ppm (d, 4H), 7.46 (d, 4H), 4.98 (m, 2H), 1.67–1.35 (m, 8H), 1.26 (d, 6H), 0.88 (t, 6H).

| Elemental analysis [%]: | theor.: C 61.54 | H 5.16 | N 4.78 | Cl 12.11; |
|---|---|---|---|---|
| C$_{30}$H$_{30}$N$_2$O$_6$Cl$_2$ | found: C 61.72 | H 5.14 | N 4.92 | Cl 12.05. |

Melting and decomposition points are reported in the table which follows.

EXAMPLE C3

4.28 g of 3,6-di-(4'-chlorophenyl)-pyrrolo[3,4,c]pyrrole-1,4-dione, 7.26 g of 2-heptyl dicarbonate from Example B3, 0.20 g of 4-dimethylaminopyridine and 300 ml of dry tetrahydrofuran are mixed and the mixture is stirred at 55° C. for 4 hours. The suspension is filtered off with suction on a glass microfilter supporting a cotton filter, the solvent is evaporated off under reduced pressure, and the residue is admixed with 100 ml of isopropanol. After 30 minutes the precipitate is filtered off with suction, washed with isopropanol and dried under reduced pressure to leave 3.46 g (45% of theory) of 2,5-di-2-heptyloxycarbonyl-3,6-di-(4'-chlorophenyl)-pyrrolo[3,4,c]pyrrole-1,4-dione as orange crystals. NMR (CDCl$_3$) [ppm]: δ=7.67 (d, 4H), 7.45 (d, 2H), 4.67 (q, 2H), 1.53 (m, 2H), 1.48 (m, 2H), 1.28 (m, 16H), 0.88 (t, 6H).

| Elemental analysis [%]: | theor.: C 63.65 | H 5.97 | N 4.37 | Cl 11.05; |
|---|---|---|---|---|
| C$_{34}$H$_{38}$N$_2$O$_6$Cl$_2$ | found: C 63.51 | H 5.95 | N 4.30 | Cl 11.12. |

Melting and decomposition points are reported in the table which follows.

EXAMPLES C4–C14

Examples C1–C3 are repeated using different pyrocarbonates. The results are reported in the table which follows (mp=melting point; dec.=decomposition point):

| Ex. | $R_{18}$ [in B = -COOR$_{18}$] | A(H)$_x$ | x | mp [° C.] | dec. [° C.] |
|---|---|---|---|---|---|
| C1 | 4-Heptyl | Pigment Red 254 | 2 | 169 | 271 |
| C2 | 2-Pentyl | Pigment Red 254 | 2 | 142 | 267 |
| C3 | 2-Heptyl | Pigment Red 254 | 2 | 107 | 268 |
| C4 | 2-Octyl | Pigment Red 254 | 2 | 84 | 250 |
| C5 | 2-Nonyl | Pigment Red 254 | 2 | 100 | 268 |
| C6 | (-)-Bornyl | Pigment Red 254 | 2 | — | ~270 |
| C7 | 1-Methoxy-2-propyl | Pigment Red 254 | 2 | 191 | 293 |
| C8 | 1-(2'-Furyl)-2-propyl | Pigment Red 254 | 2 | 198 | 276 |
| C9 | 1-Phenyl-2-propyl | Pigment Red 254 | 2 | 182 | 256 |
| C10 | 2-tert-Butylcyclohexyl | Pigment Red 254 | 2 | 209 | 241 |
| C11 | (-)-2-Isopropyl-5-methyl-cyclohexyl | Pigment Red 254 | 2 | 219 | 256 |
| C12 | 2,4-Di-tert-butyl-cyclohexyl | Pigment Red 254 | 2 | 215 | 237 |
| C13 | 2-Ethoxy-cyclohexyl | Pigment Red 254 | 2 | 168 | 297 |
| C14 | 2-(2-Methoxy-ethoxy)-cyclohexyl | Pigment Red 254 | 2 | 132 | 295 |

EXAMPLE C15

2.14 g of 3,6-di-(4'-chlorophenyl)-pyrrolo[3,4,c]pyrrole-1,4-dione, 0.72 g of sodium hydride (60%) and 150 ml of THF are mixed and stirred at 50° C. for 30 minutes. This is followed by the addition of 0.30 g of 4-dimethylaminopyridine and, dropwise, 3.60 9 of 4-heptyl pyrocarbonate from Example B1 and stirring at 50° C. for a further 40 minutes. After standing overnight, 2 ml of water are added and the batch is filtered off with suction on a glass microfilter supporting a cotton filter. The solvent is evaporated off under reduced pressure and the residue is admixed with 20 ml of methanol. The precipitate is filtered off with suction and dried under reduced pressure to leave 0.32 g (20% of theory) of 2-(4-heptyl)-oxycarbonyl-3,6-di-(4'-chlorophenyl)-pyrrolo[3,4,c]pyrrole-1,4-dione as orange powder. NMR (CDCl$_3$/DMSO) [ppm]: δ=10.01 (b, 1H), 8.56 (d, 2H), 7.72 (d, 2H), 7.49 (d, 2H), 7.47 (d, 2H), 5.02 (p, 1H), 1.68–1.25 (m, 8H).

| Elemental analyis [%]: | theor.: C 62.53 | H 4.84 | N 5.61 | Cl 14.20; |
|---|---|---|---|---|
| $C_{26}H_{24}N_2O_4Cl_2$ | found: C 61.89 | H 4.71 | N 5.21 | Cl 13.96. |

The decomposition point is reported in the table which follows.

| Ex. | $R_{18}$ [in B = —COOR$_{18}$] | A(H)$_x$ | x | mp [° C.] | dec. [° C.] |
|---|---|---|---|---|---|
| C15 | 4-Heptyl | Pigment Red 254 | 1 | | 245 |

EXAMPLE C16

2.64 g of Pigment Red 264, 0.96 g of sodium hydride (~60%) and 150 ml of dry tetrahydrofuran are mixed and the mixture is stirred at 55° C. for 9 hours. After the addition of 5.25 g of (–)-2-isopropyl-5-methylcyclohexyl chloroformate the batch is stirred at 55° C. for a further 20 hours. The suspension is filtered through a glass microfilter supporting a cotton filter, the solvent is evaporated off under reduced pressure, and the residue is admixed with 100 ml of isopropanol. The precipitate is filtered off with suction, washed with 50 ml of isopropanol and dried under reduced pressure to leave 2.57 g (54% of theory) of 2,5-di-(–)-2-isopropyl-5-methyl-cyclohexyloxycarbonyl-3,6-di-(biphenyl)-pyrrolo[3,4,c]pyrrole-1,4-dione as orange powder. NMR (CDCl$_3$): δ=7.84 ppm (d, 4H), 7.70 (d, 4H), 7.63 (d, 4H), 7.45 (t, 4H), 7.38 (d, 2H), 4.80 (dt, 2H), 2.15 (m, 2H), 1.91 (dp, 2H), 1.68 (m, 4H), 1.44 (m, 6H), 1.35 (m, 4H), 0.89 (dd, 12H), 0.79 (d, 2H).

| Elemental analysis [%]: | theor.: C 77.58 | H 7.01 | N 3.48; |
|---|---|---|---|
| $C_{52}H_{56}N_2O_6$ | found: C 76.65 | H 7.13 | N 3.52. |

Melting and decomposition points are reported below.

EXAMPLES C17–C33

Examples C1–C15 are repeated using other pigments. Melting and decomposition points are reported in the table which follows:

| Ex. | R$_{18}$ [in B = —COOR$_{18}$] | A(H)$_x$ | x | mp [° C.] | dec. [° C.] |
|---|---|---|---|---|---|
| C16 | 2-Isopropyl-5-methyl-cyclohexyl | Pigment Red 264 | 2 | 267 | 274 |
| C17 | 4-Heptyl | *3,4-dichlorophenyl DPP structure* | 2 | 174 | 251 |
| C18 | 2-Ethoxy-cyclohexyl | *3,4-dichlorophenyl DPP structure* | 2 | 214 | 285 |
| C19 | 4-Heptyl | Pigment Red 255 | 2 | 222 | 258 |
| C20 | (−)-Bornyl | Pigment Red 264 | 2 | 262 | 279 |
| C21 | 2-Ethoxy-cyclohexyl | Pigment Red 264 | 2 | — | 298 |
| C22 | 2-(2-Methoxy-ethoxy)-cyclohexyl | Pigment Red 264 | 2 | — | 300 |
| C23 | 1-(2'-Furyl)-2-propyl | Pigment Red 264 | 2 | 211 | 279 |
| C24 | 2-tert-Butylcyclohexyl | Pigment Red 264 | 2 | — | 300 |
| C25 | 4-Heptyl | *3-cyanophenyl DPP structure* | 2 | 162 | 235 |
| C26 | 2-Pentyl | *3-cyanophenyl DPP structure* | 2 | 155 | 248 |
| C27 | 4-Heptyl | *dichloroquinacridone structure* | 2 | 210 | 253 |

-continued

| Ex. | $R_{18}$ [in B = —COOR$_{18}$] | A(H)$_x$ | x | mp [° C.] | dec. [° C.] |
|---|---|---|---|---|---|
| C28 | (−)-2-Isopropyl-5-methyl-cyclohexyl | | 2 | 205 | 247 |
| C29 | (−)-Bornyl | | 2 | — | 273 |
| C30 | 1-Phenyl-2-propyl | | 2 | 196 | 255 |
| C31 | 2-tert-Butylcyclohexyl | | 2 | 231 | 252 |
| C32 | 4-tert-Butylcyclohexyl | | 2 | — | 303 |
| C33 | 2,4-Di-tert-butyl-cyclohexyl | | 2 | — | 279 |

EXAMPLE C34

30.0 g of indigo are added to a solution of 71.85 g of sodium hydroxide in 700 ml of water and the mixture is stirred at 23° C. for 30 minutes. A solution of 139.35 g of sodium dithionite in 800 ml of water is then added and the mixture is stirred for 1½ hours at 50° C. under temperature control. Then 42.29 g of the product of example B1 are added and the batch is stirred at 50° C. for a further 20 hours. 800 ml of ethyl acetate are added to the yellow suspension containing little precipitate and the two phase mixture is stirred rapidly for 20 minutes. The water phase is separated and extracted with 200 ml of ethal acetate. The organic phases are washed with 3×300 ml of water, then combined, dried with anhydrous magnesium sulfate and filtered through a glass microfilter supporting a cotton filter. The solvent is evaporated off under reduced pressure to leave brown crystals, which are suspended in ethanol, filtrated and washed with ethanol until the filtrate is colourless. After drying under reduced pressure, they are obtained 40.7 g (65.1% of theory) of the product of following formula as confirmed by NMR:

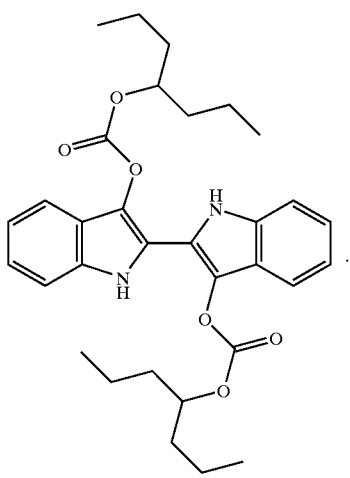

EXAMPLE D1

10.1 g of the product of Example C11, 0.4 g of 2,5-di-tert-amyloxycarbonyl-3,6-di-(3-cyanophenyl)-pyrrolo[3,4,c]pyrrole-1,4-dione prepared according to U.S. Pat. No. 5,484,943 and 989.5 g of polypropylene powder (®MOPLEN FLF 20) are thoroughly mixed and then extruded at 230° C. in a twin-screw extruder (Collin). This stage leaves the latent pigment completely dissolved in the plastic. The pellets obtained are homogeneous and intensively fluorescent.

EXAMPLE D2

The product of Example D1 is re-extruded at 300° C., and the pigment selectively re-forms completely.

EXAMPLE D3

The pellet of Example D2 is spun at 260° C. in an TMESL spinning unit into fibre. The fibre thus obtained has a brilliant red colour.

EXAMPLE D4

4.13 g of boron nitride, 1.65 g of dibutyl phthalate, 0.083 g of zinc stearate and 4.13 g of a vinyl polymer are kneaded to form a homogeneous compound which is then moulded into plates 12 mm in diameter and 1 mm in thickness. These plates are dried at 180° C. for 15 hours and then sintered at 1000° C. under an inert gas for 40 hours. Any remaining carbon is then oxidized at 700° C. under a slow stream of air to obtain white porous platelets. The cold platelets are immersed for 20 hours in a solution containing 20% by weight of a solution of perhydropolysilazane in xylene. The platelets are again heated at 600° C. under inert gas for 10 hours and then cooled down to room temperature in the course of an hour in the presence of oxygen. This process can be repeated one or more times to improve the mechanical properties of the platelets. This provides a porous sintered boridic material having very good mechanical properties.

EXAMPLE D5

The platelets of Example D4 are immersed in a 67% solution of the product of Example C11 in tetrahydrofuran and then air dried at room temperature. The platelets thus treated are then heated to 300° C. for 20 minutes, in the course of which the pigment re-forms. The platelets thus obtainable exhibit extremely high colour saturation and brilliance. They also have a very high light fastness, and compared with the untreated platelets the mechanical properties are not adversely affected.

EXAMPLE D6

The platelets of Example D4 are treated in a 25% solution of the product of Example C5 in toluene and then the pigment is regenerated similarly to Example D5. The platelets thus obtained have similar properties to those of Example D5.

EXAMPLE D6

An aluminium plate 80×30×3 mm in size and covered by an aluminium oxide layer 6 mm in thickness is swirled for 30 s in a solution of 10 g of the product of Example C11 in 20 ml of tetrahydrofuran (THF). Excess solution is removed from the plate. The plate is heated to 300° C. for 10 minutes, in the course of which the pigment is re-formed and the plate turns deep red. The plate thus treated is then held into boiling water for 10 minutes. After this treatment, very high rub fastnesses and light stabilities are obtained for the coloration.

EXAMPLE D7

Example D6 is repeated to colour a passivated aluminium plate with a solution of 2.5 g of the product of Example C3 in 20 ml of cyclohexanone. After the treatment, the aluminium plate has a brilliant red colour with excellent light and rub fastnesses.

EXAMPLE D8a

A colourless clear solution of 0.06g of hexamethoxymethylmelamine (Cymel 303™/Dyno Cytec, US), 0.25g of polyhydroxystyrene (Maruca Lyncor™ $M_w$ 5300/Maruzen Petrochemicals, JP) and 0.10 g of the product of example C34 in 1.0 g of cyclopentanone is filtered through a 0.45 $\mu$m filter and then spin coated (1000 rpm) onto a 26×38×1.0 mm glass plate (Menzel Glaser). Drying of the plate for 2 minutes at 100° C. results in a transparent and colourless 3.1 $\mu$m thin film. The visible spectrum (Cary 100 Scan UV-VIS spectrophotometer, 400–900 nm) of this film shows an extremely weak maximum at 538 nm (A=0.035).

EXAMPLE D8b

A glass plate according to example D8a is heated at 200° C. for 5 minutes, leading to a transparent blue-violet coloured thin film. The visible spectrum shows a maximum at 563 nm (A=0.362).

When only part of the plate is heated to 200° C., for example one half or pattern-wise with a thermal array or laser beam such as used in printers, the coloured and colourless zones are sharply separated, with no colorant diffusing to the colourless zones. This shows that the compound according to example C34 is immobilized as soon as its thermal decomposition has started.

EXAMPLE D8c

A glass plate according to example D8b is further heated at 240° C. for 5 minutes, leading to a transparent quasi-colourless thin film. The visible spectrum shows a maximum at 544 nm (A=0.125) and a foot absorption below 450 nm.

EXAMPLE D8d

A fine pattern is written with a UV laser on a glass plate according to example D8b. The pattern appears distinctly and nearly colourless on a blue-violet background.

The unique thermal behaviour of the product of example C34 as illustrated by examples D8a, D8b, D8c and D8d is particularly advantageous for use as a security or anti-counterfeiting feature for example in security items.

EXAMPLE D9

A mixture of 0.1 g of the compound of example C25 and 100 g of high density polyethylene (Vestolene® A6016) is formed into 29×53×1.5 mm platelets by injection moulding. The platelets processed for 5 minutes at 240° C. exhibit the typical orange colour of Pigment Orange 71.

EXAMPLE D10

A mixture of 0.1 g of the compound of example C28 and 100 g of high density polyethylene (HDPE, Vestolene® A6016) is formed into 29×53×1.5 mm platelets by injection moulding. The platelets processed for 2 minutes at 200° C. are bright yellow, while those processed for 5 minutes at 240° C. are orange, those processed for 5 minutes at 260° C. are red, and those processed for 5 minutes at 260° C. are magenta which is the typical colour of Pigment Red 202.

EXAMPLE D11

The compound of example C28 is processed at 1% by weight concentration into a 50 μm thin LDPE foil at a temperature of 200° C. A cross is stamped out of the yellow film and placed on a white ABS card and recovered with a protective transparent laminating foil (designed for a laminating temperature of about 200–250° C.). The assembly is then laminated at 230° C. for a time sufficient to yield a composite card exhibiting a red cross on white background. This card can easily be differentiated visually from similar cards having been subjected to temperatures of 240° C. or above.

EXAMPLE D12

A mixture of 0.1 g of the compound of example C34 and 100 g of high density polyethylene (Vestoleno® A6016) is formed into 29×53×1.5 mm platelets by injection moulding. The platelets processed for 5 minutes at 220° C. are dark pink, while those processed for 5 minutes at 250° C. are claret and those processed for 5 minutes at 280° C. are dark violet.

EXAMPLE D13

Bright yellow platelets are made according to example D10 (2 minutes at 200° C.). A red pattern is then written onto this plate using a 440 nm laser writing equipment.

EXAMPLE D14

A mixture of 0.05 g of the compound of example C34 and 10 g of a standard PVC composition is processed to a flexible foil by calendering at about 140° C. A pink and violet pattern is then written in one pass onto this nearly colourless foil using a 355 nm laser writing equipment, the colour obtained depending on the laser's energy and resulting local temperature rise.

The above examples are only illustrative of the invention's versatile applications. The skilled artisan will of course find numerous variations, in particular in the fields of security marking and temperature monitoring (overheat indicators).

What is claimed is:

1. A process for mass colouration of a polymer, which comprises adding at least one compound of the formula (I)

$$A(B)_x \qquad (I)$$

where x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and B is hydrogen or a group of the formula

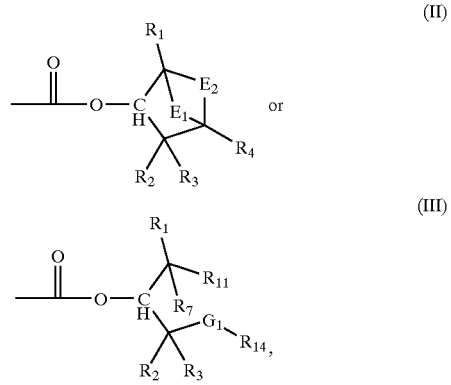

wherein at least one B group is not hydrogen and when x is from 2 to 8 the B groups may be identical or different, $E_1$ is oxygen or is selected from the group consisting of methylene, methyleneoxy and ethylene, each member of the group being unsubstituted or substituted by one $R_5$ or by 2 radicals, $R_5$ and $R_6$, or is two separate radicals, $R_7$ and $R_8$, $R_7$ being attached to the same atom as $R_1$ and $R_8$ to the same atom as $R_4$, $E_2$ is selected from the group consisting of methylene, ethylene, propylene and butylene, each member of the group being unsubstituted or substituted by one $R_9$ or by 2 radicals, $R_9$ and $R_{10}$, or is two separate radicals, $R_{11}$ and $R_{12}$, $R_{11}$ being attached to the same atom as $R_1$ and $R_{12}$ to the same atom as $R_4$, $G_1$ is O or $N(R_{13})$, $R_1$ is hydrogen, methyl, ethyl, methoxy or ethoxy, $R_2$ and $R_3$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_4$ is hydrogen, $C_1$–$C_8$alkyl, $C_1$–$C_8$alkoxy, $C_1$–$C_8$alkoxy-$C^2$–$C_8$alkylene, $C_1$–$C_8$alkoxy-$C_2$–$C_8$alkyleneoxy, $C_5$–$C_6$cycloalkyl, $C_5$–$C_6$cycloalkoxy, phenyl, phenoxy or a 5- or 6-membered, saturated or singly to triply unsaturated heterocyclic radical, $R_5$, $R_6$, $R_9$, $R_{10}$ and $R_{12}$ are independently $C_1$–$C_8$alkyl or $C_1$–$C_8$alkoxy, or $R_6$ and $R_9$ together are a direct bond, $R_7$ and $R_8$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_{11}$ is hydrogen, $C_1$–$C_8$alkyl or $C_1$–$C_8$alkoxy, $R_{13}$ is methyl or ethyl, and $R_{14}$ is $C_1$–$C_8$alkyl, $C_5$–$C_6$cycloalkyl, phenyl or a 5- or 6-membered, saturated or singly to triply unsaturated heterocyclic radical, it being possible for two methoxies attached to the same carbon atom to combine and form 1,2-ethylenedioxy, or for methoxy to combine with ethoxy attached to the same carbon atom to form 1,2- or 1,3-propylenedioxy, or for methoxy or ethoxy to combine with ethoxy attached to α- or β-enchained carbon to form dimethylmethylene, and where additionally a) $R_1$, $R_2$, $R_3$, $R_7$ or $R_{11}$ is hydrogen, and
b) when $E_1$ is two separate radicals $R_7$ and $R_8$ and $E_2$ is methylene or ethylene at least one of the following further conditions applies:

$R_1$, $R_2$, $R_3$, $R_4$, $R_7$, $R_8$, $R_9$ or $R_{10}$ is methoxy or ethoxy;

$R_2$, $R_3$, $R_4$, $R_7$, $R_8$, $R_9$ or $R_{10}$ is secondary $C_3$–$C_8$alkyl or tertiary $C_4$–$C_8$alkyl or $C_3$–$C_8$alkoxy;

$R_2$, $R_3$, $R_7$ or $R_8$ is $C_1$–$C_8$alkoxy-$C_2$–$C_8$alkylene or $C_1$–$C_8$alkoxy-$C_2$–$C_8$alkyleneoxy; or $R_4$ is $C_5$–$C_6$cycloalkyl, $C_5$–$C_6$cycloalkoxy, phenyl, phenoxy or a 5- or 6-membered heterocyclic radical to the polymer before or during processing, the processing taking the form of extrusion, injection moulding or fibre spinning at 220 to 330° C.

2. An engineering plastic having a glass transition point ($T_g$) of 220 to 330° C., wherein the plastic is polyolefin, polyester, polyamide or a polyimide, polysulfone, polyether sulfone, polyphenylene oxide, polyarylene, polyarylene sulfide, polyepoxide, polyphenylene oxide or ABS, pigmented according to claim 1.

3. An engineering plastic according to claim 2 in the form of a fibre.

4. A process for pigmenting a porous material, which comprises at least one compound of the formula (I)

$$A(B)_x \qquad (I)$$

where x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and B is hydrogen or a group of the formula

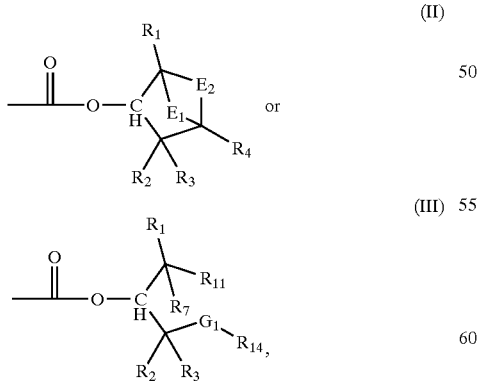

wherein at least one B group is not hydrogen and when x is from 2 to 8 the B groups may be identical or different, $E_1$ is oxygen or is selected from the group consisting of methylene, methyleneoxy and ethylene, each member of the group being unsubstituted or substituted by one $R_5$ or by 2 radicals, $R_5$ and $R_6$, or is two separate radicals, $R_7$ and $R_8$, $R_7$ being attached to the same atom as $R_1$ and $R_8$ to the same atom as $R_4$, $E_2$ is selected from the group consisting of methylene, ethylene, propylene and butylene, each member of the group being unsubstituted or substituted by one $R_9$ or by 2 radicals, $R_9$ and $R_{10}$, or is two separate radicals, $R_{11}$ and $R_{12}$, $R_{11}$ being attached to the same atom as $R_1$ and $R_{12}$ to the same atom as $R_4$, $G_1$ is O or $N(R_{13})$, $R_1$ is hydrogen, methyl, ethyl, methoxy or ethoxy, $R_2$ and $R_3$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_4$ is hydrogen, $C_1$–$C_8$alkyl, $C_1$–$C_8$alkoxy, $C_1$–$C_8$alkoxy-$C_2$–$C_8$alkylene, $C_1$–$C_8$alkoxy-$C_2$–$C_8$alkyleneoxy, $C_5$–$C_8$cycloalkyl, $C_5$–$C_6$cycloalkoxy, phenyl, phenoxy or a 5- or 6-membered, saturated or singly to triply unsaturated heterocyclic radical, $R_5$, $R_6$, $R_9$, $R_{10}$ and $R_{12}$ are independently $C_1$–$C_8$alkyl or $C_1$–$C_8$alkoxy, or $R_6$ and $R_9$ together are a direct bond, $R_7$ and $R_8$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_{11}$ is hydrogen, $C_1$–$C_8$alkyl or $C_1$–$C_8$alkoxy, $R_{13}$ is methyl or ethyl, and $R_{14}$ is $C_1$–$C_8$alkyl, $C_5$–$C_6$cycloalkyl, phenyl or a 5- or 6-membered, saturated or singly to triply unsaturated heterocyclic radical, it being possible for two methoxies attached to the same carbon atom to combine and form 1,2-ethylenedioxy, or for methoxy to combine with ethoxy attached to the same carbon atom to form 1,2- or 1,3-propylenedioxy, or for methoxy or ethoxy to combine with ethoxy attached to α- or β-enchained carbon to form dimethylmethylene, and where additionally a) $R_1$, $R_2$, $R_3$, $R_7$ or $R_{11}$ is hydrogen, and
b) when $E_1$ is two separate radicals $R_7$ and $R_8$ and $E_2$ is methylene or ethylene at least one of the following further conditions applies:

$R_1$, $R_2$, $R_3$, $R_4$, $R_7$, $R_8$, $R_9$ or $R_{10}$ is methoxy or ethoxy;

$R_2$, $R_3$, $R_4$, $R_7$, $R_8$, $R_9$ or $R_{10}$ is secondary $C_3$–$C_8$alkyl or tertiary $C_4$–$C_8$alkyl or $C_3$–$C_8$alkoxy;

$R_2$, $R_3$, $R_7$ or $R_8$ is $C_1$–$C_8$alkoxy-$C_2$–$C_8$alkylene or $C_1$–$C_8$alkoxy-$C_2$–$C_8$alkyleneoxy; or $R_4$ is $C_5$–$C_6$cycloalkyl, $C_5$–$C_6$cycloalkoxy, phenyl, phenoxy or a 5- or 6-membered heterocyclic radical, in liquid form or dissolved in an inert liquid in a weight concentration of at least 25%, penetrating into the pores of the porous material and thereafter being thermally converted into a pigment of the formula $$A(H)_x \qquad (VI)$$

wherein A and x have the same meaning as in formula (I).

5. Material pigmented according to claim 4, selected from anodized aluminium and sintered boridic material.

6. High molecular weight organic material having a glass transition point ($T_g$) of 140° C. to 220° C. and containing in its bulk 0.1 to 10% by weight of a compound of the formula (I)

$$A(B)_x \quad (I)$$

where x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and B is hydrogen or a group of the formula

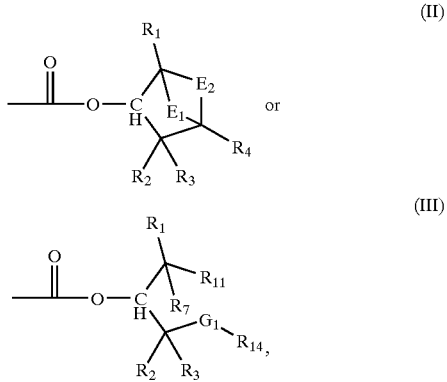

wherein at least one B group is not hydrogen and when x is from 2 to 8 the B groups may be identical or different, $E_1$ is oxygen or is selected from the group consisting of methylene, methyleneoxy and ethylene, each member of the group being unsubstituted or substituted by one $R_5$ or by 2 radicals, $R_5$ and $R_6$, or is two separate radicals, $R_7$ and $R_8$, $R_7$ being attached to the same atom as $R_1$ and $R_8$ to the same atom as $R_4$, $E_2$ is selected from the group consisting of methylene, ethylene, propylene and butylene, each member of the group being unsubstituted or substituted by one $R_9$ or by 2 radicals, $R_9$ and $R_{10}$, or is two separate radicals, $R_{11}$, and $R_{12}$, $R_{11}$ being attached to the same atom as $R_1$ and $R_{12}$ to the same atom as $R_4$, $G_1$ is O or $N(R_{13})$, $R_1$ is hydrogen, methyl, ethyl, methoxy or ethoxy, $R_2$ and $R_3$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_4$ is hydrogen, $C_1$–$C_8$alkyl, $C_1$–$C_8$alkoxy, $C_1$–$C_8$alkoxy-$C_2$–$C_8$alkylene, $C_1$–$C_8$alkoxy-$C_2$–$C_8$alkyleneoxy, $C_5$–$C_6$cycloalkyl, $C_5$–$C_6$cycloalkoxy, phenyl, phenoxy or a 5- or 6-membered, saturated or singly to triply unsaturated heterocyclic radical, $R_5$, $R_6$, $R_9$, $R_{10}$ and $R_{12}$ are independently $C_1$–$C_8$alkyl or $C_1$–$C_8$alkoxy, or $R_6$ and $R_9$ together are a direct bond, $R_7$ and $R_8$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_{11}$ is hydrogen, $C_1$–$C_8$alkyl or $C_1$–$C_8$alkoxy, $R_{13}$ is methyl or ethyl, and $R_{14}$ is $C_1$–$C_8$alkyl, $C_5$–$C_6$cycloalkyl, phenyl or a 5- or 6-membered, saturated or singly to triply unsaturated heterocyclic radical, it being possible for two methoxies attached to the same carbon atom to combine and form 1,2-ethylenedioxy, or for methoxy to combine with ethoxy attached to the same carbon atom to form 1,2- or 1,3-propylenedioxy, or for methoxy or ethoxy to combine with ethoxy attached to α- or β-enchained carbon to form dimethylmethylene, and where additionally a) $R_1$, $R_2$, $R_3$, $R_7$ or $R_{11}$ is hydrogen, and b) when $E_1$ is two separate radicals $R_7$ and $R_8$ and $E_2$ is methylene or ethylene at least one of the following further conditions applies:

$R_1$, $R_2$, $R_3$, $R_4$, $R_7$, $R_8$, $R_9$ or $R_{10}$ is methoxy or ethoxy;

$R_2$, $R_3$, $R_4$, $R_7$, $R_8$, $R_9$ or $R_{10}$ is secondary $C_3$–$C_8$alkyl or tertiary $C_4$–$C_8$alkyl or $C_3$–$C_8$alkoxy;

$R_2$, $R_3$, $R_7$ or $R_8$ is $C_1$–$C_8$alkoxy-$C_2$–$C_8$alkylene or $C_1$–$C_8$alkoxy-$C_2$–$C_8$alkyleneoxy; or $R_4$ is $C_5$–$C_6$cycloalkyl, $C_5$–$C_6$cycloalkoxy, phenyl, phenoxy or a 5- or 6-membered heterocyclic radical, based on the total weight.

7. A thermochromic material comprising a polymer coloured in the mass by a product obtainable by partial thermal decomposition of a compound of the formula (I)

$$A(B)_x \quad (I)$$

where x is an integer from 1 to 8,

A is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x B groups via one or more heteroatoms, these heteroatoms being selected from the group consisting of N, O and S and forming part of the radical A, and B is hydrogen or a group of the formula

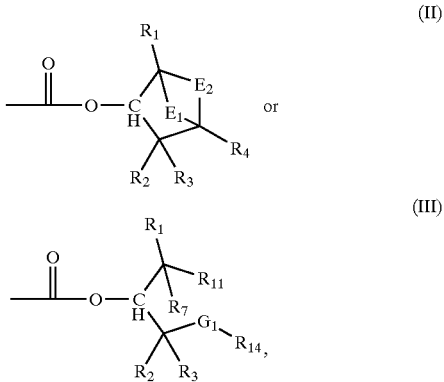

wherein at least one B group is not hydrogen and when x is from 2 to 8 the B groups may be identical or different, $E_1$ is oxygen or is selected from the group consisting of methylene, methyleneoxy and ethylene, each member of the group being unsubstituted or substituted by one $R_5$ or by 2 radicals, $R_5$ and $R_6$, or is two separate radicals, $R_7$ and $R_8$, $R_7$ being attached to the same atom as $R_1$ and $R_8$ to the same atom as $R_4$, $E_2$ is selected from the group consisting of methylene, ethylene, propylene and butylene, each member of the group being unsubstituted or substituted by one $R_9$ or by 2 radicals, $R_9$ and $R_{10}$, or is two separate radicals, $R_{11}$ and $R_{12}$, $R_{11}$ being attached to the same atom as $R_1$ and $R_{12}$ to the same atom as $R_4$, $G_1$ is O or $N(R_{13})$, $R_1$ is hydrogen, methyl, ethyl, methoxy or ethoxy, $R_2$ and $R_3$ are independently hydrogen, $C_1$–$C_8$alkyl, $C_1$–$C_8$alkoxy, $C_1$–$C_8$alkoxy-$C_2$–$C_8$alkylene or $C_1$–$C_8$alkoxy-$C_2$–$C_8$alkyleneoxy, $R_4$ is hydrogen, $C_1$–$C_8$alkyl, $C_1$–$C_8$alkoxy, $C_1$–$C_8$alkoxy-$C_2$–$C_8$alkylene, $C_1$–$C_8$alkoxy-$C_2$–$C_8$alkyleneoxy, $C_5$–$C_6$cycloalkyl, $C_5$–$C_6$cycloalkoxy, phenyl, phenoxy or a 5- or 6-membered, saturated or singly to triply unsaturated heterocyclic radical, $R_5$, $R_6$, $R_9$, $R_{10}$ and $R_{12}$ are independently $C_1$–$C_8$alkyl or $C_1$–$C_8$alkoxy, or $R_6$ and $R_9$ together are a direct bond, $R_7$ and $R_8$ are independently hydrogen, $C_1$–$C_8$alkyl, $C_1$–$C_8$alkoxy, $C_1$–$C_6$alkoxy-$C_2$–$C_8$alkylene or $C_1$–$C_8$alkoxy-$C_2$–$C_8$alkyleneoxy, $R_{11}$ is hydrogen, $C_1$–$C_8$alkyl or $C_1$–$C_8$alkoxy, $R_{13}$ is methyl or ethyl, and $R_{14}$ is $C_1$–$C_8$alkyl, $C_5$–$C_6$cycloalkyl, phenyl or a 5- or 6-membered, saturated or singly to triply unsaturated heterocyclic radical, it being possible for two methoxies attached to the same carbon atom to combine and form 1,2-ethylenedioxy, or for methoxy to combine with ethoxy attached to the same carbon atom to form 1,2- or 1,3-propylenedioxy, or for methoxy or ethoxy to combine with ethoxy attached to α- or β-enchained carbon to form dimethylmethylene, and where additionally a) $R_1$, $R_2$, $R_3$, $R_7$ or $R_{11}$ is hydrogen, and b) when $E_1$ is two separate radicals $R_7$ and $R_8$ and $E_2$ is methylene or ethylene at least one of the following further conditions applies:

$R_1$, $R_2$, $R_3$, $R_4$, $R_7$, $R_8$, $R_9$ or $R_{10}$ is methoxy or ethoxy;

$R_2$, $R_3$, $R_4$, $R_7$, $R_8$, $R_9$ or $R_{10}$ is secondary $C_3$–$C_8$alkyl or tertiary $C_4$–$C_8$alkyl or $C_3$–$C_8$alkoxy;

$R_2$, $R_3$, $R_7$ or $R_8$ is $C_1$–$C_8$alkoxy-$C_2$–$C_8$alkylene or $C_1$–$C_8$alkoxy-$C_2$–$C_8$alkyleneoxy; or $R_4$ is $C_5$–$C_6$cycloalkyl, $C_5$–$C_6$cycloalkoxy, phenyl, phenoxy or a 5- or 6-membered heterocyclic radical or by two compounds, selected from the group consisting of compounds of the formula (I) and pigments of the formula $$A(H)_x \qquad (VI)$$

wherein A and x have the same meaning as in formula I.

8. A thermochromic material according to claim 7, which is within a security item.

9. A process according to claim 4 for pigmenting a porous material wherein formula (I) comprises a binary or ternary mixture including 60 to 99.9% by weight of a compound of the formula (I) and 0.1 to 40% by weight of one or two thermally more labile compounds of the same chromophore class with an A' that differs from A.

10. A process according to claim 9 wherein the thermally more labile compound of the same chromophore class with an A' that differs from A is a compound of the formula

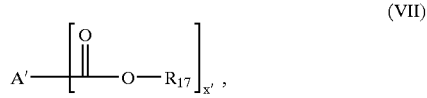

(VII)

where x' is an integer from 1 to 8 and A' is the radical of a chromophore of the quinacridone, anthraquinone, perylene, indigo, quinophthalone, indanthrone, isoindolinone, isoindoline, dioxazine, azo, phthalocyanine or diketopyrrolopyrrole series, this radical being linked with x' —$COOR_{17}$ groups via one or more heteroatoms, these heteroatoms being selected from the group consisting of N, O and S and forming part of the radical A' and $R_{17}$ being a tertiary organic group.

11. A process according to claim 4 for pigmenting a porous material wherein formula (I) is a mixture according to claim 9, which is a binary mixture of 99.5 to 95% by weight of a compound of the formula (I) and 0.5 to 5% by weight of a thermally more labile compound of the same chromophore class with an A' that differs from A.

12. A process according to claim 10 for pigmenting a porous material, wherein said $R_{17}$ radicals are selected from the group consisting of tert-butyl, tert-amyl, 2-methyl-3-buten-2-yl, 2-methyl-3-butyn-2-yl, 4-oxa-2-pentyl and 4,7-dioxa-1-methyl-2-octyl.

* * * * *